US009921099B1

(12) United States Patent
Davila et al.

(10) Patent No.: US 9,921,099 B1
(45) Date of Patent: Mar. 20, 2018

(54) SPHERICAL OCCULTER CORONAGRAPH CUBESAT

(71) Applicant: The United States of America as represented by the Administrator of the National Aeronautics and Space Administration, Washington, DC (US)

(72) Inventors: Joseph M. Davila, West Friendship, MD (US); Douglas M. Rabin, Arnold, MD (US); Nelson Reginald, Bryans Road, MD (US); Qian Gong, Columbia, MD (US); Neerav Shah, Columbia, MD (US); Phillip C. Chamberlin, Gambrills, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 8 days.

(21) Appl. No.: 15/254,323

(22) Filed: Sep. 1, 2016

(51) Int. Cl.
*G01J 1/04* (2006.01)
*G01J 1/44* (2006.01)
*B64G 1/24* (2006.01)
*B64G 1/10* (2006.01)
*G01J 1/02* (2006.01)
*G01J 1/42* (2006.01)
(Continued)

(52) U.S. Cl.
CPC ............ *G01J 1/0437* (2013.01); *B64G 1/105* (2013.01); *B64G 1/26* (2013.01); *B64G 1/406* (2013.01); *G01J 1/0266* (2013.01); *G01J 1/0271* (2013.01); *G01J 1/4228* (2013.01); *G01J 1/44* (2013.01); *G01S 3/7861* (2013.01); *G01J 2001/4266* (2013.01); *G01J 2001/446* (2013.01)

(58) Field of Classification Search
CPC .......... G01J 1/0437; G01J 1/04; G01J 1/0266; G01J 1/0271; G01J 1/4228; G01J 1/44; G01J 2001/4266; G01J 2001/446; G01S 3/7861; G01S 3/7862; B64G 1/105; B64G 1/26; B64G 1/24; B64G 1/406; B64G 2001/1064
See application file for complete search history.

(56) References Cited

U.S. PATENT DOCUMENTS 5,257,759 A * 11/1993 Bender .................. B64G 1/363
244/168
5,279,483 A * 1/1994 Blancke ................... B64G 1/24
244/165
(Continued)

*Primary Examiner* — John Lee
(74) *Attorney, Agent, or Firm* — Christopher O. Edwards; Bryan A. Geurts; Mark P. Dvorscak

(57) ABSTRACT

The present invention relates to a space-based instrument which provides continuous coronal electron temperature and velocity images, for a predetermined period of time, thereby improving the understanding of coronal evolution and how the solar wind and Coronal Mass Ejection transients evolve from the low solar atmosphere through the heliosphere for an entire solar rotation. Specifically, the present invention relates to using a 6U spherical occulter coronagraph CubeSat, and a relative navigational system (RNS) that controls the position of the spacecraft relative to the occulting sphere. The present invention innovatively deploys a free-flying spherical occulter, and after deployment, the actively controlled CubeSat will provide an inertial formation flying with the spherical occulter and Sun.

20 Claims, 4 Drawing Sheets

(51) Int. Cl.
*G01S 3/786* (2006.01)
*B64G 1/26* (2006.01)
*B64G 1/40* (2006.01)

(56) References Cited

U.S. PATENT DOCUMENTS

| | | | | |
|---|---|---|---|---|
| 6,019,320 | A * | 2/2000 | Shah | B64G 1/24 |
| | | | | 244/164 |
| 7,784,740 | B2 * | 8/2010 | Massonnet | G02B 27/58 |
| | | | | 244/171.1 |
| 7,828,451 | B2 * | 11/2010 | Cash | G02B 27/58 |
| | | | | 359/601 |
| 8,251,315 | B2 * | 8/2012 | Leyre | B64G 1/1085 |
| | | | | 244/158.4 |
| 8,772,690 | B2 * | 7/2014 | Smith | G01C 21/24 |
| | | | | 250/203.6 |
| 9,334,068 | B2 * | 5/2016 | Kronhaus | B64G 1/26 |
| 9,676,500 | B2 * | 6/2017 | Eckersley | B64G 1/105 |
| 2011/0155858 | A1 * | 6/2011 | Lagadec | B64G 1/1021 |
| | | | | 244/171 |
| 2015/0052874 | A1 * | 2/2015 | Keidar | B64G 1/405 |
| | | | | 60/204 |
| 2017/0227351 | A1 * | 8/2017 | Hyland | G01P 15/00 |

* cited by examiner

SPHERICAL OCCULTER CORONAGRAPH CUBESAT

BACKGROUND OF THE INVENTION

1. Field of the Invention

The present invention relates to a space-based instrument which can provide continuous coronal electron temperature and velocity images, for a predetermined period of time, thereby improving the understanding of coronal evolution and how the solar wind and coronal mass ejection (CME) transients evolve from the low solar atmosphere through the heliosphere for an entire solar rotation. Specifically, the present invention relates to using a spherical occulter coronagraph CubeSat, and a relative navigational system that controls the position of the spacecraft relative to the occulting sphere.

2. Description of the Related Art

Conventional solar coronagraphs measure visible photospheric light Thomson-scattered by coronal electrons, imaging the seemingly static solar corona including transients, such as Coronal Mass Ejections (CMEs), as they disrupt the overlying magnetic field.

However, the resolution of the images in the low corona is related to the distance that the external occulter is from the imaging optics; the farther the occulter the better the image. This is why a total solar eclipse is the ideal coronagraph, as the moon is over 200,000 miles from the observers. Traditional imagers use mechanical structures, such as tubes, to mount and align the occulter to the optics, and these structures limit this distance to ~1 meter due to volume/mass limitations to get these instruments into space.

Thus, a coronagraph that is capable of eliminating any mechanical structure and utilize inertial formation flying of two separate spacecraft, one containing the occulter and the other the spacecraft, is desired.

SUMMARY OF THE INVENTION

The present invention relates to a space-based instrument which can provide continuous, high-resolution coronal electron temperature and velocity images, for a predetermined period of time (i.e., one month), thereby improving the understanding of coronal evolution and how the solar wind and CME transients evolve from the low solar atmosphere through the heliosphere for an entire solar rotation. Specifically, the present invention relates to using a spherical occulter coronagraph (SOC) CubeSat, and a relative navigational system (RNS) that controls the position of the spacecraft relative to the occulting sphere.

In one embodiment, the present invention relates to a novel 6 U (U-type spacecraft) spherical occulter coronagraph Cubesat, which can meet science observations from 1.5 RSun to 5 RSun. In one embodiment, the novel spherical occulter coronagraph of the present invention innovatively deploys a free-flying spherical occulter (instead of a flat disk), and after deployment, the actively controlled CubeSat provides a novel inertial formation flying with the sphere and Sun using a novel relative navigational system (RNS).

In one embodiment, the RNS includes a plurality of RNS photodiodes for sensing the translation and range of the spherical occulter relative to the spacecraft, and for formation flying feedback.

In one embodiment, the spherical occulter coronagraph of the present invention has greater than 2.25 m separation between the occulter and optics, greater than prior art separations which are approximately 0.8 m to 1.3 m. This larger separation improves the signal-to-noise ratio due to reduced diffraction intensities off the occulter, a dominant noise source in coronagraphs. The spherical occulter coronagraph's separation also leads to greatly improved spatial resolution over current externally occulted coronagraphs in the diffraction-limited region, from vignetting in the low corona.

Additionally, the spherical occulter coronagraph CubeSat of the present invention is a pathfinder directly scalable to coronagraphs with even larger separations, possibly hundreds of meters in length, using inflatable spherical occulters. The spherical occulter coronagraph of the larger-scale coronagraphs will have even better signal/noise ratio and spatial resolution, providing high-resolution images and plasma diagnostics down to <1.05 solar radii.

In one embodiment, the spherical occulter coronagraph CubeSat of the present invention can be used in any Earth-escape orbit that will take the spherical occulter coronagraph CubeSat out of the influence of Earth's atmospheric density variations and changing gravitational forces, simplifying formation flying while providing a 100% view of the Sun.

In one embodiment, the spherical occulter coronagraph CubeSat of the present invention includes a plurality of novel technology features, including: 1) inertial formation-flying with a passive secondary including release technique, control scheme, and software; 2) theoretical diffractive performance of a spherical occulter, expected to be superior to the traditional flat knife-edge occulters; 3) fine Sun-pointing from a CubeSat platform; 4) interplanetary communication from a CubeSat; 5) μCAT microthrusters; and 6) approximately 1 U volume coronagraph optics and filter wheel, not including the occulter.

In one embodiment, the occulter coronagraph CubeSat of the present invention includes: a spherical occulter; an occulter release mechanism; wherein the spherical occulter is deployed from an occulter guide tube disposed in a body of the occulter coronagraph CubeSat, using the occulter release mechanism.

In one embodiment, the spherical occulter is coated with a black paint material which provides greater than 90% absorption of any scattered light, and is a conductive surface which provides forward scatter suppression around the spherical occulter.

In one embodiment, the occulter coronagraph CubeSat includes: a relative navigation system (RNS) including a plurality of photodiodes, including first lateral photodiodes, second lateral photodiodes, full-sun photodiodes, and range photodiodes, the plurality of photodiodes which sense a translation and range of the spherical occulter to control a position of the CubeSat relative to the spherical occulter, and for formation flying feedback of a plurality of CubeSats.

In one embodiment, the full-sun photodiodes are disposed on outer edges of a front face of the CubeSat, and are used to determine a full Sun intensity and allow for relative measurements of the plurality of photodiodes in the CubeSat; wherein the first lateral photodiodes are disposed a predetermined distance from an aperture lens of the spherical occulter, and are used for lateral motion sensing; wherein the range photodiodes are used for range measurement and are disposed at predetermined distances from the aperture lens; wherein the second lateral photodiodes are disposed at a bottom of the occulter guide tube proximate to the occulter release mechanism, and detect lateral movement of the spherical occulter during release, to confirm that the spherical occulter has left the occulter guide tube.

In one embodiment, the spherical occulter is a formation flying, passive, free-flying occulter, which reduces forward scattering noise contributed by diffraction around the spherical occulter at an inner half-angle field-of-view (FOV) of 0.375°, corresponding to $1.5R_{Sun}$.

In one embodiment, a size of the spherical occulter and the occulter release mechanism is maximized to an 8 cm diameter to fit into a 1 U unit allocation.

In one embodiment, the occulter coronagraph CubeSat measures an electron temperature and a bulk electron vector velocity of the Sun's corona during one full Carrington rotation.

In one embodiment, the occulter coronagraph CubeSat utilizes a heliocentric orbit.

In one embodiment, the occulter coronagraph CubeSat further includes: a de-tumble or sun finding mode; and an occulter deployment model; wherein the de-tumble or sun finding mode arrests a tipoff rotation rate, and a plurality of course sensors are used to find the Sun and reorient the occulter coronagraph CubeSat to point the front face to the Sun; and wherein the occulter deployment mode utilizes the occulter release mechanism to deploy the spherical occulter.

In one embodiment, the occulter coronagraph CubeSat further includes: a science mode which points the spherical occulter at <0.5 deg with respect to the Sun, and a jitter of less than 18" of jitter over a 9-sec integration; wherein the spherical occulter always occludes the Sun based on a relative position between the spherical occulter and the occulter coronagraph CubeSat.

In one embodiment, the occulter coronagraph CubeSat further includes: a plurality of micro-cathode vacuum arc thrusters which are used for in-space micro-propulsion; wherein the thrusters are fired for a prescribed burn after the spherical occulter is deployed, in order to back the occulter coronagraph CubeSat away from the spherical occulter; and wherein on condition that the spherical occulter has successfully cleared the occulter coronagraph CubeSat, the thrusters are fired to translate the occulter coronagraph CubeSat so that the spherical occulter covers the aperture lens to occult the Sun, and to move the occulter coronagraph CubeSat further from the spherical occulter along an optical axis.

In one embodiment, the occulter coronagraph CubeSat thrusts away from the spherical occulter with a force of about 1 micro-N.

In one embodiment, a method of occulting a corona of the Sun, includes: deploying an occulter coronagraph CubeSat in a heliocentric orbit; wherein the occulter coronagraph CubeSat includes a spherical occulter, which is deployed from an occulter guide tube disposed in a body of the occulter coronagraph CubeSat utilizing an occulter release mechanism.

In one embodiment, the method of occulting a corona of the Sun further includes: utilizing a plurality of micro-cathode vacuum arc thrusters for in-space micro-propulsion; wherein the thrusters are fired for a prescribed burn after the spherical occulter is deployed, in order to back the occulter coronagraph CubeSat away from the spherical occulter; wherein on condition that the spherical occulter has successfully cleared the occulter coronagraph CubeSat, the thrusters are fired to first translate the occulter coronagraph CubeSat so that the spherical occulter covers the aperture lens to occult the Sun, and to move the occulter coronagraph CubeSat further from the spherical occulter along an optical axis; and wherein the occulter coronagraph CubeSat thrusts away from the spherical occulter with a force of about 1 micro-N.

Thus has been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

DESCRIPTION OF THE INVENTION

The present invention on relates to a space-based instrument which can provide continuous coronal electron temperature and velocity images, for a predetermined period of time (i.e., one month), thereby improving the understanding of coronal evolution and how the solar wind and Coronal Mass Ejection (CME) transients evolve from the low solar atmosphere through the heliosphere for an entire solar rotation. Specifically, the present invention relates to using a novel spherical occulter coronagraph (SOC) CubeSat, and a relative navigational system (RNS) that controls the position of the spacecraft relative to the occulting sphere.

In one embodiment, the present invention relates to a novel 6 U (U-type spacecraft) spherical occulter coronagraph (SOC) Cubesat 100 (see FIGS. 1-4), which can meet science observations from 1.5 RSun to 5 RSun. In one embodiment, the novel spherical occulter coronagraph of the present invention innovatively deploys a free-flying spherical occulter 201 (see FIG. 2) (instead of a flat disk), and after deployment, the actively controlled CubeSat 100 will provide a novel inertial formation flying with the spherical occulter 201 and Sun.

System Design

Figure 1:
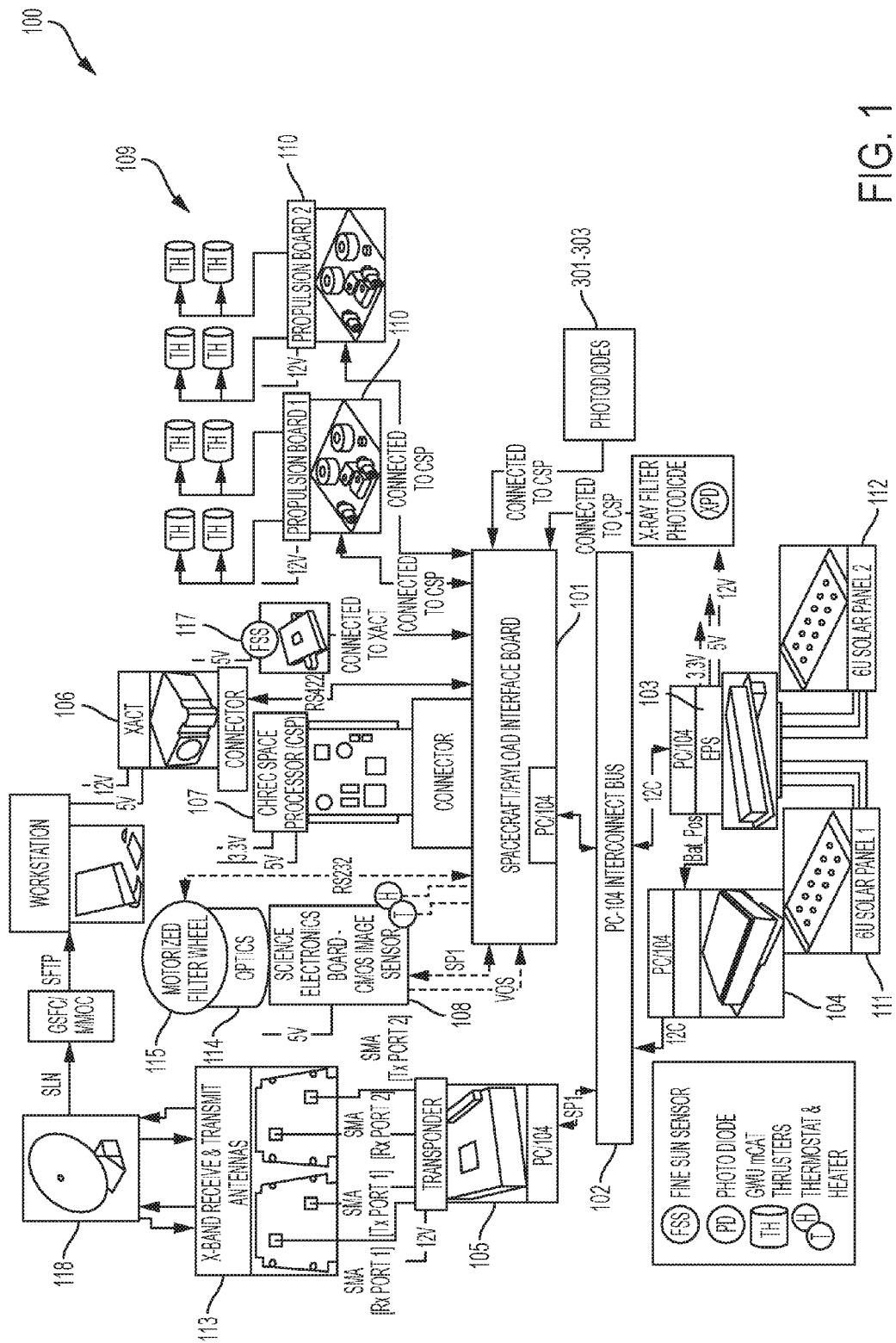
FIG. 1 is a block diagram of the spherical occulter coronagraph CubeSat of the present invention, showing exemplary subsystems and interface connections, according to one embodiment consistent with the present invention.

In one embodiment, FIG. 1 shows exemplary components of the novel spherical occulter coronagraph CubeSat 100 of the present invention. In one embodiment, a spacecraft and payload interface board 101 enables communication to the computer standardized bus (i.e., PC/104) 102 subsystems: space Electrical Power System (EPS) 103, batteries 104, and X-band transceiver 105. A CHREC (Center for High-Performance Reconfigurable Computing) space processor (CSP 107) is connected to the bus 102 via a connector 119. The interface board 101 enables communication to non-PC/104 subsystems such as and X-ray advanced concepts testbed (XACT) sounding rocket 106, the CSP 107, the science complementary metal-oxide semiconductor (CMOS) imager board 108, and a plurality of micro-cathode vacuum arc thrusters (CAT) 109 with electric propulsion boards 110. The micro-cathode vacuum arc thrusters (μCAT) 109 are used for in-space micro-propulsion applications, and are high specific impulse (Isp), low-thrust electric propulsion suitable for small satellite attitude control, precision orbit control or extended low-thrust maneuvers. In one embodiment, the CubeSat 100 compatible, Deep Space Network (DSN) 118 compatible X-band transponder 105 can operate on any channel in deep space or the near Earth X-band.

In one embodiment, the optical equipment 114 of the spherical occulter 201 was designed to be placed in a 6 U CubeSat 100. In one embodiment, the optical design of the present invention meets all science-derived requirements, and the entire optics package 114 (see FIGS. 1 and 4), including focusing lenses (i.e., entrance aperture lens 207 etc.), as well as the filter wheel 115, all fit into just over a 1 U volume package.

In one embodiment, the flight software of the CSP 107 has communication and control of the science electronics board 101, the guidance, navigation and control (GNC) relative navigational system (RNS), and the detection of a CME. The CFE allows for custom applications to be developed independently. This is especially useful for the relative navigational system (RNS) as it will run as a separate process within the CFE and communicate via the messaging middleware.

In one embodiment, the XACT 106 is one of two subsystems of the guidance, navigation and control system (GNC) of the spherical occulter coronagraph CubeSat 100— namely, the attitude control system (ACS), which controls the attitude of the 6 U spacecraft 100 relative to the Sun; and the novel relative navigational system (RNS).

In one embodiment, as part of the ACS, a course sun sensor (CSS) photodiode 205 (see FIG. 2) is placed on each of the satellite faces (bottom panel 200, top panel 202, front panel 204, and back panel) for course Sun-sensor positional knowledge. The CSS photodiodes 205 are small photodiodes used for course determination of the Sun's position, and are used only in the initial de-tumble and sun-finding modes (discussed later).

In one embodiment, also as part of the ACS, a Fine Sun Sensor (FSS) 117 is incorporated in the XACT 106 and used to maintain fine pointing (<0.3°)to the Sun. Further, the FSS 117 is mounted such that it does not protrude past the outer surface (front panel 204) of the spacecraft body (see FIG. 2) in order to not reflect light into the optics 114.

Figure 2:
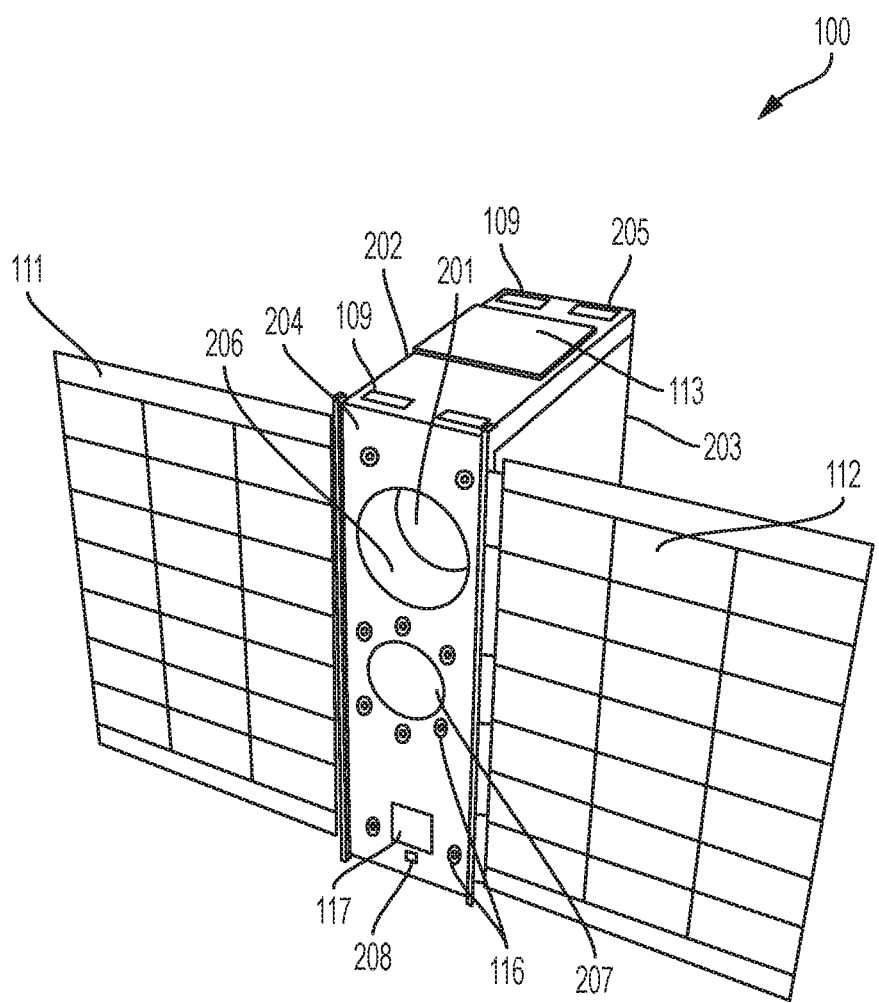
FIG. 2 is a perspective view of a spherical occulter coronagraph CubeSat, showing the front panel and top panel, according to one embodiment consistent with the present invention.
Figure 3:
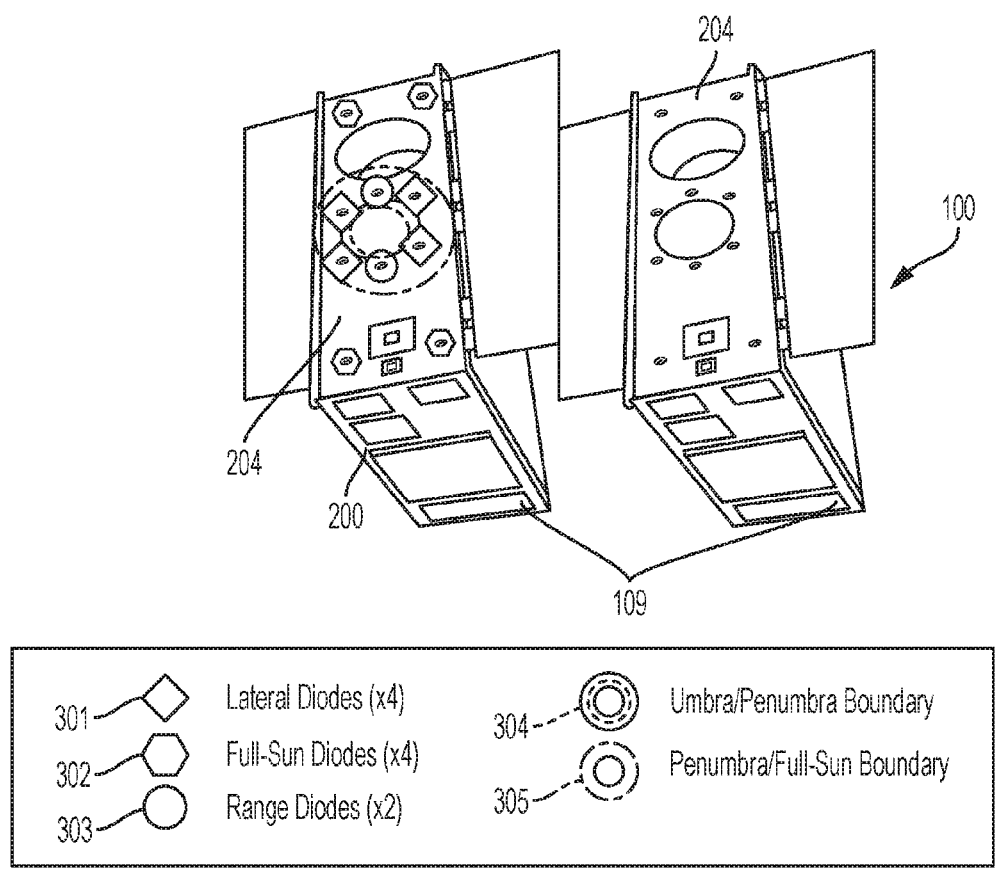
FIG. 3 is a view of the spherical occulter coronagraph CubeSata, where the right-most version is clear of any labels and shows the umbral and penumbral shadow of the spherical occuler on the front panel, and the left version shows symbols and annotations describing the components of the relative navigation system (RNS), according to one embodiment consistent with the present invention.
Figure 4:
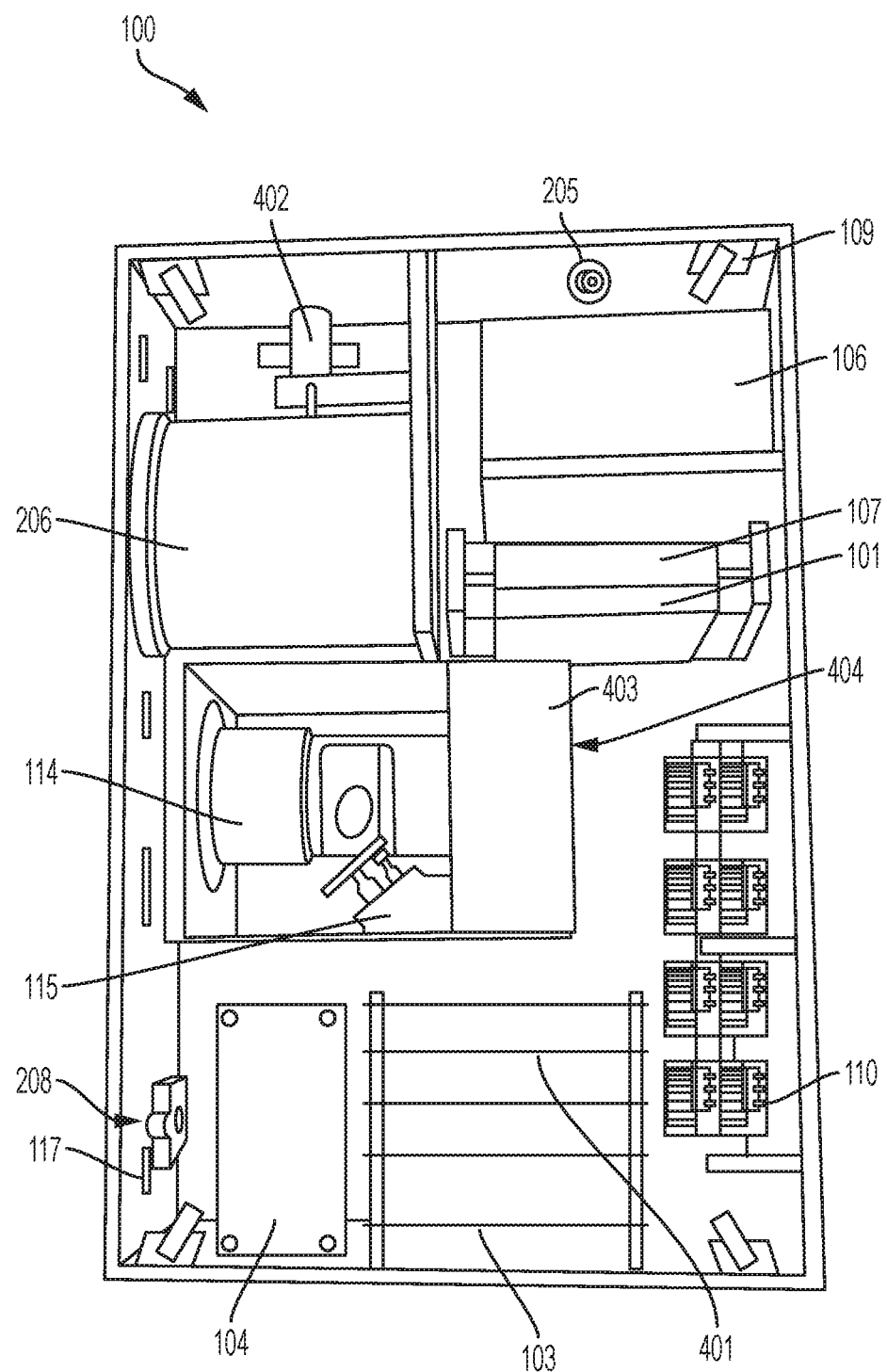
FIG. 4 is a rear, open panel view, showing the components within, of the spherical occulter coronagraph CubeSat according to one embodiment consistent with the present invention.

In one embodiment, a plurality of μCAT thrusters 109 are mounted on the payload 100 at each corner of the top panel 202 and facing outward (see FIG. 2), while the set is mirrored on the bottom panel 200 (see FIG. 3). In one exemplary embodiment, an arrangement of eight μCAT thrusters 109 is the minimum number needed at each of these corners of the CubeSat 100 to produce motion in both translation and rotation on each body axis. This will allow for control of the spacecraft 100 relative to the spherical occulter 201 as well as allow for dumping momentum (i.e., allowing the momentum wheels from the XACT 106 system to spin down to maintain spacecraft 100 attitude), if needed (but which is not expected). However, one of ordinary skill in the art would know that the placement and number of thrusters may change depending on requirements.

As noted above, in one embodiment, the second subsystem of the GNC is the novel relative navigation system (RNS) that controls the position of the spacecraft 100 relative to the occulting sphere 201. In one embodiment, the inertial navigation includes a plurality of RNS photodiodes (see FIG. 3)—for example, four Lateral photodiodes 301, four Full-Sun photodiodes 302, two Range photodiodes 303, and two other Lateral photodiodes (not shown)—for sensing the translation and range of the spherical occulter 201 relative to the spacecraft 100, and for formation flying feedback. However, one of ordinary skill in the art would know that the placement and number of photodiodes may change depending on requirements.

FIG. 3 also shows the extent of the umbra boundary 304 and penumbra boundary 305 from the novel spherical occulter 201 on the face of the occulter coronagraph CubeSat 100. In one embodiment, four exemplary Full-Sun photodiodes 302 on the outer edges of the science (front) face 204 are used to determine the full sun intensity and should never be shadowed unless the spherical occulter 201 has drifted and the spacecraft 100 has not compensated for it. In one embodiment, the Full-Sun photodiodes 302 allow for relative and not absolute measurements of all inertial alignment diodes to remove other variables from the system (e.g., thermal, proton storms, etc.).

In one embodiment, the occulter/aperture distance, given the occulter 301 diameter, was iterated with the signal calculation, which was limited by the occulter diffraction, to define the inner FOV cutoff to be 1.5 $R_{Sun}$. Note that the spherical occulter 301 spatial resolution from vignetting is moderate until about 1.75 $R_{Sun}$. The spherical occulter coronagraph CubeSat 100 of the present invention is utilizing formation flying, thus, if the noise and diffraction are lower than theoretically calculated it is easy to adjust the distance control algorithm via upload command to move the spherical occulter 301 farther away, enabling observations lower in the solar corona. This leads to a separation of 2.25 m with the 50 cm aperture, resulting in a much better vignetting-limited spatial resolution than current coronagraphs.

In one embodiment, the exemplary inside Lateral diodes 301, which are disposed, for example, at 4 cm from the aperture lens 207, are used for lateral motion sensing. When the spherical occulter 201 is centered over a CMOS detector 403 (see FIG. 4), the shadow it casts will have equal intensity on all four exemplary Lateral sensors 301. The Lateral photodiodes 301 are insensitive to the range, as they are located at a radius equal to the radius of the spherical occulter 201. The CMOS detector 403 is optimal due to the power limitation on a CubeSat 100, and it interfaces with the interface board 101 to transfer data into the CSP 107 for further handling.

In one embodiment, there are two other sensors—Range diodes 303—used for range measurement, and that may be located in an exemplary location, such as 4.25 cm and 4.5 cm from the aperture lens 207 center. The relative intensity of the sun light going from the umbra 304 through the penumbra 305 to full sun light on the spacecraft front face 204, changes for a number of ranges corresponding to different solar radii. By using the difference in intensities on each of these range photodiodes 303, the range can be determined. As the spacecraft moves further away from the spherical occulter 201, and the effective solar radius of the spherical occulter 201 gets smaller, the penumbra grows.

In one embodiment, the Lateral motion sensors 401 are shadowed for all ranges. In one embodiment, the Ranging diodes 403 are placed such that they will be more accurate at long ranges. Any effect on the estimation of range inside the 1.5 $R_{Sun}$ baseline is irrelevant as fine control is not needed here.

In one embodiment, the two remaining Lateral photodiodes (not shown) are on the inside edges at the bottom of the occulter guide tube 206 near the release mechanism 402. The Lateral photodiodes detect if the spherical occulter 201 first moves outward during the release and pullback by the spacecraft 100 until the spherical occulter 201 is clear and followed by the translation maneuver of the spacecraft 100 until the now free-flying spherical occulter 201 is in position in front of the instrument aperture lens 207, providing knowledge that the occulter 201 has left the occulter guide tube 206 and is centered on the aperture lens 207. In one embodiment, based on estimated noise of the photodiodes 301-303 and accompanying electrical circuits to read them, the intensity of the photodiodes 301-303 can conservatively be estimated within 1% of full scale which gives a range accuracy of ~13 cm and a lateral accuracy of ~1 mm for a shadow from the sphere relative size of 1.5 $R_{Sun}$.

In one embodiment, the spherical occulter coronagraph CubeSat 100 of the present invention uses two space 6 U single-sided long-edge deployable solar panels 111, 112, each panel 111, 112 containing a plurality of solar cells (for example, 21 solar cells of which seven (7) are in series and three (3) in parallel—7s3p configuration) on only the outer face (see FIG. 2). The solar cells provide power to the CubeSat 100 when the panels 111, 112 are stowed prior to panel deployment. The operating temperature of the solar cells 111, 112 is around +80° C.

In one embodiment, in addition to the two 6 U deployable solar panels 111, 112, and filter wheel 115, the spacecraft 100 includes other onboard mechanisms such as a release mechanism 402 (see FIG. 4) for the occulter 201. In one embodiment, the spherical occulter's 201 size, along with its deployment or release mechanism 402 (see FIG. 3), was maximized to an 8 cm diameter to fit into a 1 U unit allocation.

In one embodiment, the 6 U deployable solar panels 111, 112 include all necessary mounting hardware and release mechanisms that incorporate a thermal knife and time driver system (not shown). When deployed, the spring loaded hinge system (not shown) of the release mechanism 402 will open the panels to a 90° position to be normal to the Sun for maximum power production.

The occulter release mechanism 402 contains a pin puller among other components. A cupped plunger (not shown) is used to hold the occulter 201 against the wall of the occulter guide tube 206. Upon actuation of the pin puller (not shown), a compression spring pushes the plunger away from the occulter 201 such that it is free to move. The compression spring (not shown) maintains force on the plunger so that it will not return to the occulter guide tube 206.

In one embodiment a three (3)-node thermal mode provides operating temperatures for the solar panels 111, 112, and also ensures that the CMOS chip 403 can be run at −20° C. (to .reduce detector 403 noise) using a simply conductive thermal strap 404 (see FIG. 4) tied to a dedicated 10 cm by 20 cm white paint radiator patch on the aft end 203 of the spacecraft 100. There is also a significant margin to dissipate the rest of the internal heat sources given the rest of the CubeSat 100 faces 300, 302 303, 305 behind the solar panels 113, 114.

In one embodiment, the power system is designed such that power experiment is only during the science window; power transmitter is only during the exemplary transmit time (e.g., 240 minutes per day); and power guidance, navigation and control (GNC) and command and data handling (C&DH) (science and housekeeping) is conducted 100% of the time.

In one embodiment, the batteries 104 are configured in a 2s3p configuration, and are designed to integrate with a suitable EPS 103 and the solar arrays 111, 112 to form a complete power system for the spherical occulter coronagraph CubeSat 100.

In one embodiment, the spherical occulter 201, as a formation flying, passive, free-flying occulter 210, reduces the forward scattering noise contributed by diffraction around the occulter 201, by over an order of magnitude versus the traditional knife-edge disk occulter at the occulter 201 inner half-angle FOV of 0.375°, corresponding to 1.5 $R_{Sun}$. The noise reduction is also more than 7 orders of magnitude greater at the occulter 201 outer FOV cutoff of 5 $R_{Sun}$.

In one embodiment, sunlight reflected/scattered off the spacecraft 100, or directly from the Earth or lunar albedo, hitting the spherical occulter 201 could possibly be scattered into the entrance aperture. However, the worst-case scatter light path (Sun to solar panels 111, 112 to occulter 201 into aperture) is reduced by nine orders of magnitude. This large reduction is due to insuring there are no direct reflection paths, only Lambertian scattering, as well as black painting the sphere and the small (1° FOV) of the sphere 201. So these scatter paths off of the back of the occulter 201 are not a significant source of noise.

In one embodiment, although there is no "tube" between the occulter 201 and the aperture to block light, there is no concern regarding scattered light entering into the optical path/aperture off the passive occulter 201. In one embodiment, the spherical occulter 201 is coated with a black paint material which provides better than 90% absorption of any scattered light as well as being a conductive surface which provides forward scatter suppression around said spherical occulter.

In one embodiment, the instrument optics 114, filter wheel 115, and CMOSIS Chip and Board 503 are enclosed on their sides with sheet metal closeouts to keep out stray light. In one embodiment, the four telemetry cards 401 (see FIG. 4) and EPS 103 are maintained in a stack in order to best utilize a CubeSat Kit connector 405 to the interface 101. In one embodiment, custom mounting brackets are used to place each of the eight propulsion thrusters 109 at the corners of the spacecraft body 100 and maintain the desired 45° orientation.

In one embodiment, in order to use the temperature and velocity ratio techniques described below, four bandpass filters (not shown) are used. A visible filter position, which is used to reduce the noise signal, is used to obtain standard broadband white light coronagraph images. A dark position for dark-image subtraction is also needed, and this will also be used for optics/CMOS protection during launch and times in the mission prior to occulter 201 deployment when the full Sun enters the optics 114. This leads to six total filter positions needed in the filter wheel 115. In one embodiment, the diameters of the four bandpass filters will be adjusted to the spherical occulter coronagraph optical design and placed in the filter wheel 115 to automatically cycle through the four different wavelengths along with the visible Sun and dark filter positions.

In one embodiment, a soft X-ray photodiode 208 (e.g., AXUV20 with Beryllium filter) is used to detect flares. It is a smaller photodiode 208 than existing X-ray photodiodes in order to reduce resources, and is a thicker filter to reduce dynamic range. An intensity level is set at about C-class flare level, that when breached, will flag upcoming observations for the next three hours as a priority for downlink.

Science Mode

In one embodiment, the components described above of the spherical occulter coronagraph CubeSat 100 of the present invention are used to perform the tasks of determining the bulk electron flow velocity and plasma temperature of the Sun's corona throughout one full Carrington rotation (i.e., 27 days for a solar rotation), and to determine the bulk electron flow velocity and plasma temperature of Coronal Mass Ejections (CMEs).

In one embodiment, the CubeSat 100 of the present invention will provide information on how the temperature and flows in these large scale coronal structures change over a single Carrington rotation due to the underlying emerging, evolving, and decaying active regions and the subsequent changes these drive in the overlying solar corona, as well as the dynamics of the solar wind and multiple CMEs that disrupt the steady state corona, and which can have significant Space Weather impacts.

In one embodiment, the CubeSat 100 provides the white-light image of the solar corona from 1.5 solar radii (RSun) out to 5 RSun, but with its set of an exemplary four bandpass filters, it will also be able to produce the first-ever continuous space-based maps of the coronal temperature and bulk electron velocity.

In one embodiment, the spherical occulter coronagraph CubeSat 100 of the present invention will provide additional measurements of the electron temperature and the bulk electron vector velocity—not just the transverse velocity—significantly increasing understanding of the dynamics and evolution of these complex events.

Flight Operations

In one embodiment, the reasons that a heliocentric orbit is ideal for formation flying include, but are not limited to:

1) It is free from high-frequency external forces present in low-Earth orbit, such as those from density perturbations in the Earth's atmosphere or from the Earth's varying gravitational influence that would act differently on the two different spacecraft 100 in formation flying (see FIG. 3). The inertial formation flying corrections that will need to be made are much less frequent and are slowly changing. The solar radiation pressure will act on both spacecraft 100 in the same direction, and solar wind and CMEs are insignificant due to their small densities.

2) The heliocentric orbit also provides a continuous view of the Sun that is free from eclipses, leading to 100% observation time to view eruptive events in their entirety.

3) The heliocentric orbit is also free from elliptical orbital perturbations that would restrict formation-flying missions that are in orbit around Earth, to once per orbit. Inertial formation-flying dynamics require the two spacecraft 100 to have the same semi-major axis in order to have the same orbital period, so almost all locations along the orbit are useless.

The spherical occulter coronagraph CubeSat 100 of the present invention includes two operational modes.

Mode 1 is the De-tumble/Sun finding mode. In one embodiment, the De-tumble mode starts after spherical occulter coronagraph separation when the spacecraft 100 comes alive, when the ACS switches to De-tumble mode and arrests the tipoff rotation rates. The course sun sensors 205 are used to initially find the Sun and reorient it to point the correct face at the Sun. The solar panels 111, 112 are deployed once the fine sun sensors (FSS) 117 register that the Sun has been obtained and the FSS 117 take control. The spacecraft 100 will wait in the De-tumble mode until the second mode—Occulter deployment—which will occur after lunar swing-by, to ensure the occculter 201 will not be lost during swing-by.

In Mode 2—Occulter deployment—the spherical occulter 201 is released so as to not impart an unknown velocity between the two objects 100. After the spherical occulter 201 is released, the thrusters 109 are fired for a prescribed burn to back the 6 U spacecraft 100 away from the spherical occulter 201, where a photodiode at the base of the occulter guide tube 206 registers that the spherical occulter 201 has successfully cleared the spacecraft 100. The CSP 107 will then fire the thrusters 109 to first translate the CubeSat 100 so that the spherical occulter 201 covers the lens 207 to occult the Sun; and second, to move the spacecraft 100 further from the spherical occulter 201 along the optical axis.

In another mode—the Science Mode—the ACS and RNS algorithms will run continuously throughout the Science mission ensuring 100% views of the Sun with inertial alignment to within the pointing requirements. The science operation is simply either taking data or transmitting data, and pointing at the Sun continuously; no additional pointing offsets are needed for transmission or receiving.

In one embodiment, the science requirement for pointing is <0.5 deg with respect to the Sun and a jitter of less than 18" of jitter over a 9-sec integration. The spacecraft 100 position relative to the occulting sphere 301 must be maintained such that the Sun is always occluded. The relative movement during an exposure is not as critical, but should be kept to less than 0.1 cm, which is easily accommodated.

In one embodiment, in a heliocentric orbit, the primary forces and torques on the spacecraft 100 will be due to solar pressure. The spherical occulter 201 has a much smaller area than the spacecraft 100 but weights much less; therefore, it will want to move towards the spacecraft 100 after deployment. In order to maintain a desired range, the spacecraft 100 will have to thrust away from the sphere 201 with a force of about 1 micro-N. In one exemplary embodiment, if the center of gravity is 5 cm away from the center of pressure, the torque from solar pressure will be about 4e-8 Nm which equates to about 3.5 mNms per day. At tipoff, if a 3 deg/sec body rate is assumed, the momentum wheels need to absorb about 8 mNms momentum with at least 2 mNms to spare for a rotation maneuver to find the Sun for a total capacity needed of about 10 mNms.

In one embodiment, the spherical occulter coronagraph of the present invention measures the electron temperature and bulk electron velocity in the corona, providing additional continuous measurements of physical variables beyond the current standard imaging coronagraph. With the addition of polarization filter, application of this technique can be made further out in the solar corona.

Not only does the spherical occulter coronagraph of the present invention have stand-alone science achievements, it also addresses technology that can be used for larger, higher-class missions, including: 1) inertial formation flying with a passive secondary including release technique, control scheme, and software; 2) theoretical diffractive performance of a spherical occulter, expected to be superior to the traditional flat knife-edge occulters; 3) fine Sun-pointing in a CubeSat; 4) interplanetary communication from a CubeSat; 5) μCAT microthrusters; and 6) approximately 1 U volume coronagraph optics and filter wheel, not including the occulter.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. An occulter coronagraph CubeSat comprising:
a spherical occulter;
an occulter release mechanism;
wherein said spherical occulter is deployed from an occulter guide tube disposed in a body of said occulter coronagraph CubeSat, using said occulter release mechanism.

2. The occulter coronagraph CubeSat of claim 1, wherein said spherical occulter is coated with a black paint material which provides greater than 90% absorption of any scattered light, and is a conductive surface which provides forward scatter suppression around said spherical occulter.

3. The occulter coronagraph CubeSat of claim 1, further comprising:
a relative navigation system comprising a plurality of photodiodes, including first lateral photodiodes, second lateral photodiodes, full-sun photodiodes, and range photodiodes, said plurality of photodiodes which sense a translation and range of said spherical occulter to control a position of the CubeSat relative to said spherical occulter, and for formation flying feedback of a plurality of CubeSats.

4. The occulter coronagraph CubeSat of claim 3, wherein said full-sun photodiodes are disposed on outer edges of a front face of the CubeSat, and are used to determine a full Sun intensity and allow for relative measurements of said plurality of photodiodes in the CubeSat;
wherein said first lateral photodiodes are disposed a predetermined distance from an aperture lens of said spherical occulter, and are used for lateral motion sensing;
wherein said range photodiodes are used for range measurement and are disposed at predetermined distances from said aperture lens;
wherein said second lateral photodiodes are disposed at a bottom of said occulter guide tube proximate to said occulter release mechanism, and detect lateral movement of said spherical occulter during release, to confirm that said spherical occulter has left said occulter guide tube.

5. The occulter coronagraph CubeSat of claim 3, wherein said spherical occulter is a formation flying, passive, free-flying occulter, which reduces forward scattering noise contributed by diffraction around said spherical occulter at an inner half-angle field-of-view (FOV) of 0.375°, corresponding to 1.5 $R_{Sun}$.

6. The occulter coronagraph CubeSat of claim 4, wherein a size of said spherical occulter and said occulter release mechanism is maximized to an 8 cm diameter to fit into a 1 U unit allocation.

7. The occulter coronagraph CubeSat of claim 6, wherein the occulter coronagraph CubeSat measures an electron temperature and a bulk electron vector velocity of the Sun's corona during one full Carrington rotation.

8. The occulter coronagraph CubeSat of claim 7, wherein the occulter coronagraph CubeSat utilizes a heliocentric orbit.

9. The occulter coronagraph CubeSat of claim 8, further comprising:
a de-tumble or sun finding mode; and
an occulter deployment model;
wherein said de-tumble or sun finding mode arrests a tipoff rotation rate, and a plurality of course sensors are used to find the Sun and reorient the occulter coronagraph CubeSat to point said front face to the Sun; and
wherein said occulter deployment mode utilizes said occulter release mechanism to deploy said spherical occulter.

10. The occulter coronagraph CubeSat of claim 9, further comprising:
a science mode which points said spherical occulter at <0.5 deg with respect to the Sun, and a jitter of less than 18" of jitter over a 9-sec integration;
wherein said spherical occulter always occludes the Sun based on a relative position between said spherical occulter and the occulter coronagraph CubeSat.

11. The occulter coronagraph CubeSat of claim 10, further comprising:
a plurality of micro-cathode vacuum arc thrusters which are used for in-space micro-propulsion;
wherein said thrusters are fired for a prescribed burn after said spherical occulter is deployed, in order to move the occulter coronagraph CubeSat away from said spherical occulter; and
wherein on condition that said spherical occulter has successfully cleared the occulter coronagraph CubeSat, the thrusters are fired to translate the occulter coronagraph CubeSat so that said spherical occulter covers said aperture lens to occult the Sun, and to move the occulter coronagraph CubeSat further from said spherical occulter along an optical axis.

12. The occulter coronagraph CubeSat of claim 11, wherein the occulter coronagraph CubeSat thrusts away from said spherical occulter with a force of about 1 micro-N.

13. A method of occulting a corona of the Sun, comprising:
deploying an occulter coronagraph CubeSat in a heliocentric orbit;
wherein said occulter coronagraph CubeSat comprises a spherical occulter, which is deployed from an occulter guide tube disposed in a body of said occulter coronagraph CubeSat utilizing an occulter release mechanism.

14. The method of claim 13, wherein said spherical occulter is a formation flying, passive, free-flying occulter.

15. The method of claim 14, wherein said spherical occulter is coated with a black paint material which provides better than 90% absorption of any scattered light as well as being a conductive surface which provides forward scatter suppression around said spherical occulter.

16. The method of claim 15, wherein said spherical occulter reduces forward scattering noise contributed by diffraction around said spherical occulter at an inner half-angle field-of-view (FOV) of 0.375°, corresponding to 1.5 $R_{Sun}$.

17. The method of claim 16, wherein a size of said spherical occulter and said occulter release mechanism is maximized to an 8 cm diameter to fit into a 1 U unit allocation.

18. The method of claim 17, wherein said occulter coronagraph CubeSat measures an electron temperature and a bulk electron vector velocity of the Sun's corona during one full Carrington rotation.

19. The method of claim 18, wherein said occulter coronagraph CubeSat includes a de-tumble or sun finding mode; an occulter deployment mode, and a science mode;
   wherein said de-tumble or sun finding mode arrests a tipoff rotation rate, and a plurality of course sensors are used to find the Sun and reorient said occulter coronagraph CubeSat to point said front face to the Sun;
   wherein said occulter deployment mode utilizes said occulter release mechanism to deploy said spherical occulter;
   wherein said science mode includes pointing said spherical occulter at <0.5 deg with respect to the Sun, and a jitter of less than 18" of jitter over a 9-sec integration, and said spherical occulter always occludes the Sun based on a relative position between said spherical occulter and said occulter coronagraph CubeSat.

20. The method of claim 19, further comprising:
   utilizing a plurality of micro-cathode vacuum arc thrusters for in-space micro-propulsion;
   wherein said thrusters are fired for a prescribed burn after said spherical occulter is deployed, in order to move said occulter coronagraph CubeSat away from said spherical occulter;
   wherein on condition that said spherical occulter has successfully cleared said occulter coronagraph CubeSat, said thrusters are fired to first translate the occulter coronagraph CubeSat so that said spherical occulter covers said aperture lens to occult the Sun, and to move the occulter coronagraph CubeSat further from said spherical occulter along an optical axis; and
   wherein said occulter coronagraph CubeSat thrusts away from said spherical occulter with a force of about 1 micro-N.

* * * * *